W. J. MUNCASTER.
STEADY REST FOR SHAFTING LATHES.
APPLICATION FILED JUNE 13, 1907.
984,288.
Patented Feb. 14, 1911.
4 SHEETS—SHEET 1.
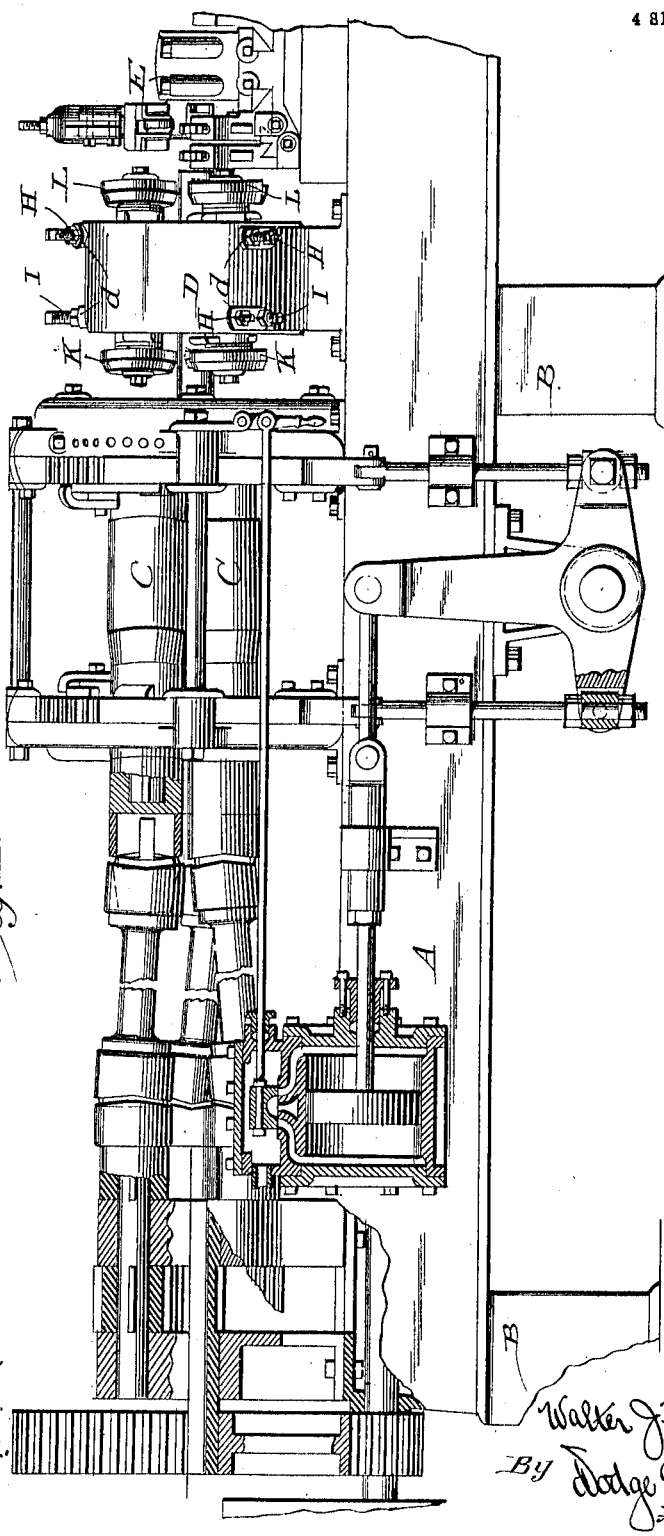

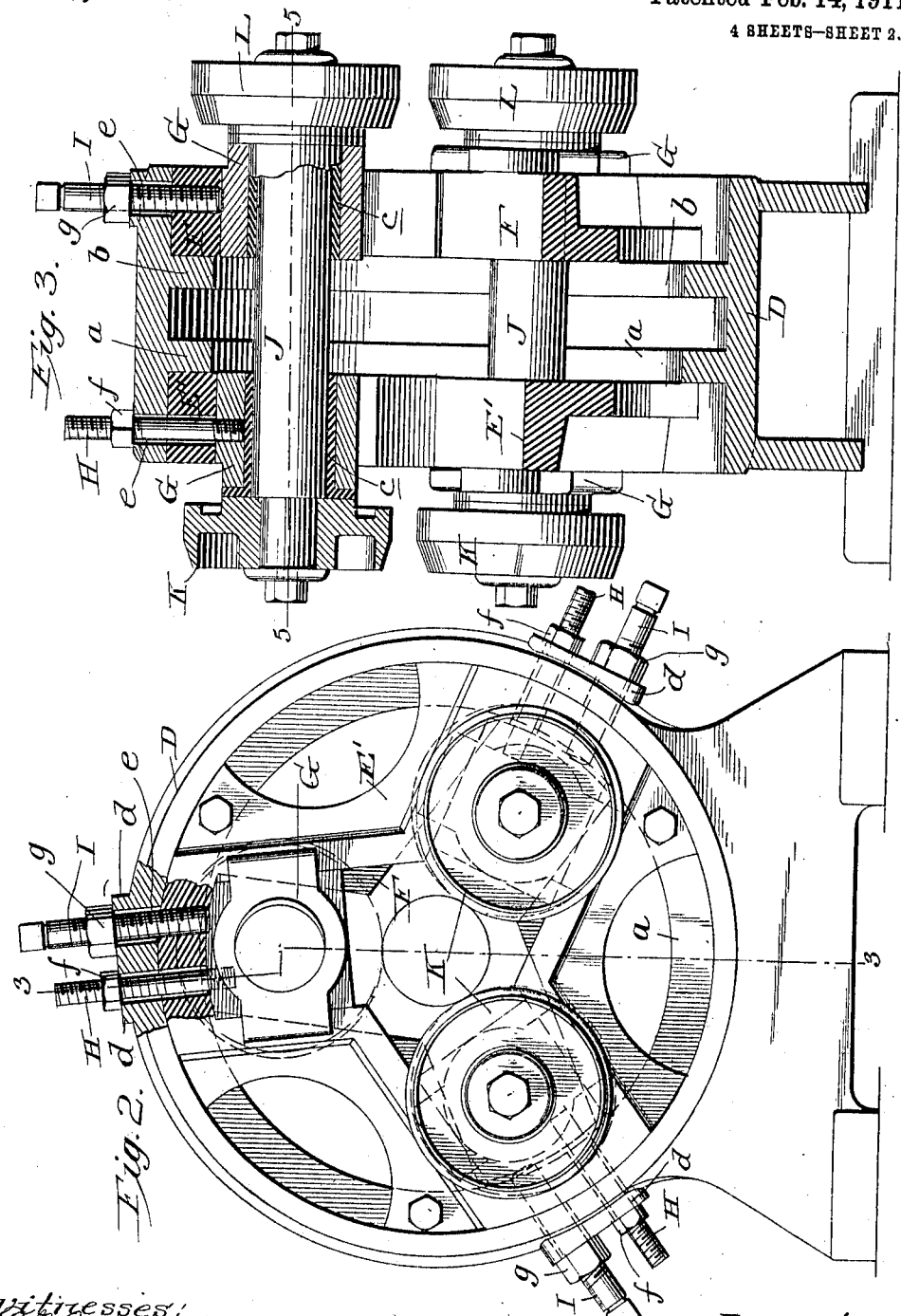

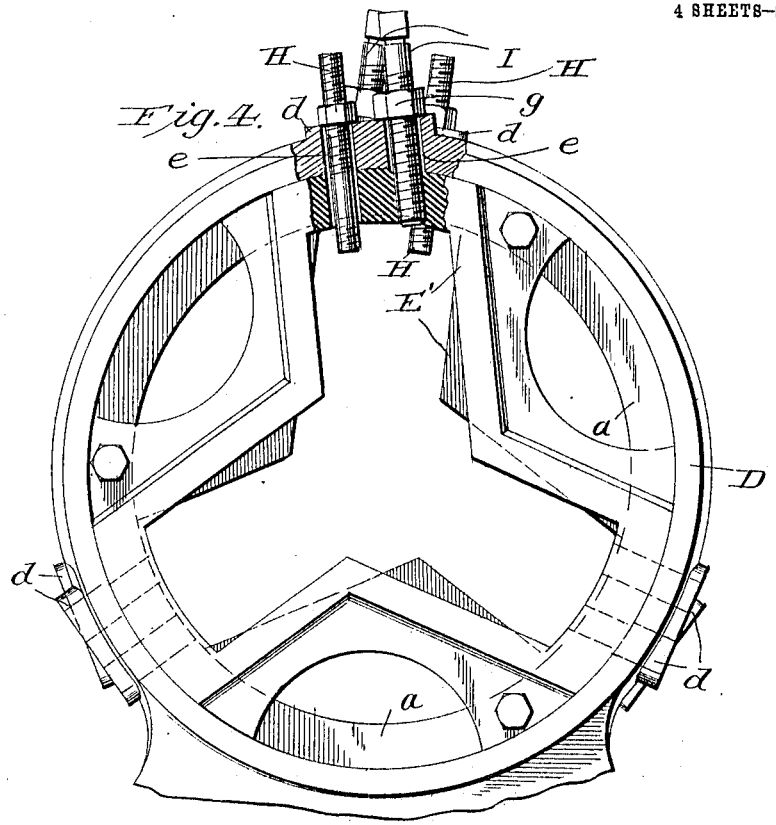
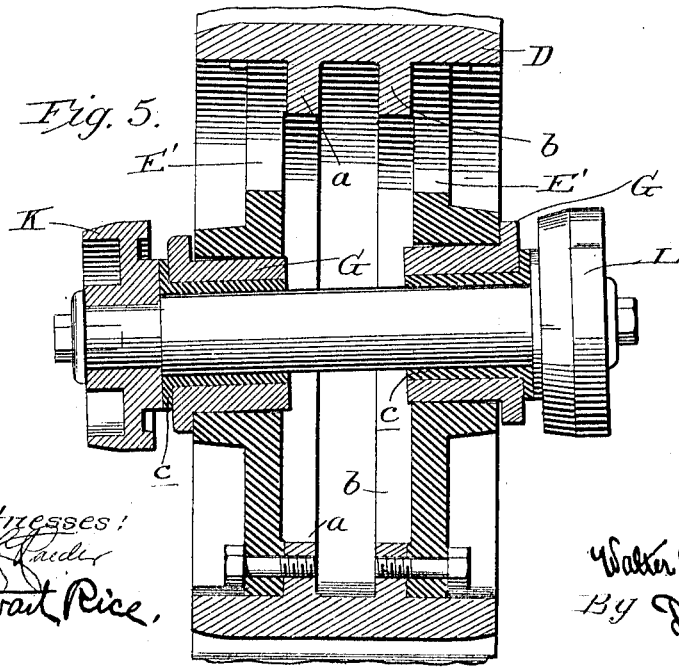

W. J. MUNCASTER.
STEADY REST FOR SHAFTING LATHES.
APPLICATION FILED JUNE 13, 1907.
984,288.
Patented Feb. 14, 1911.
4 SHEETS—SHEET 4.
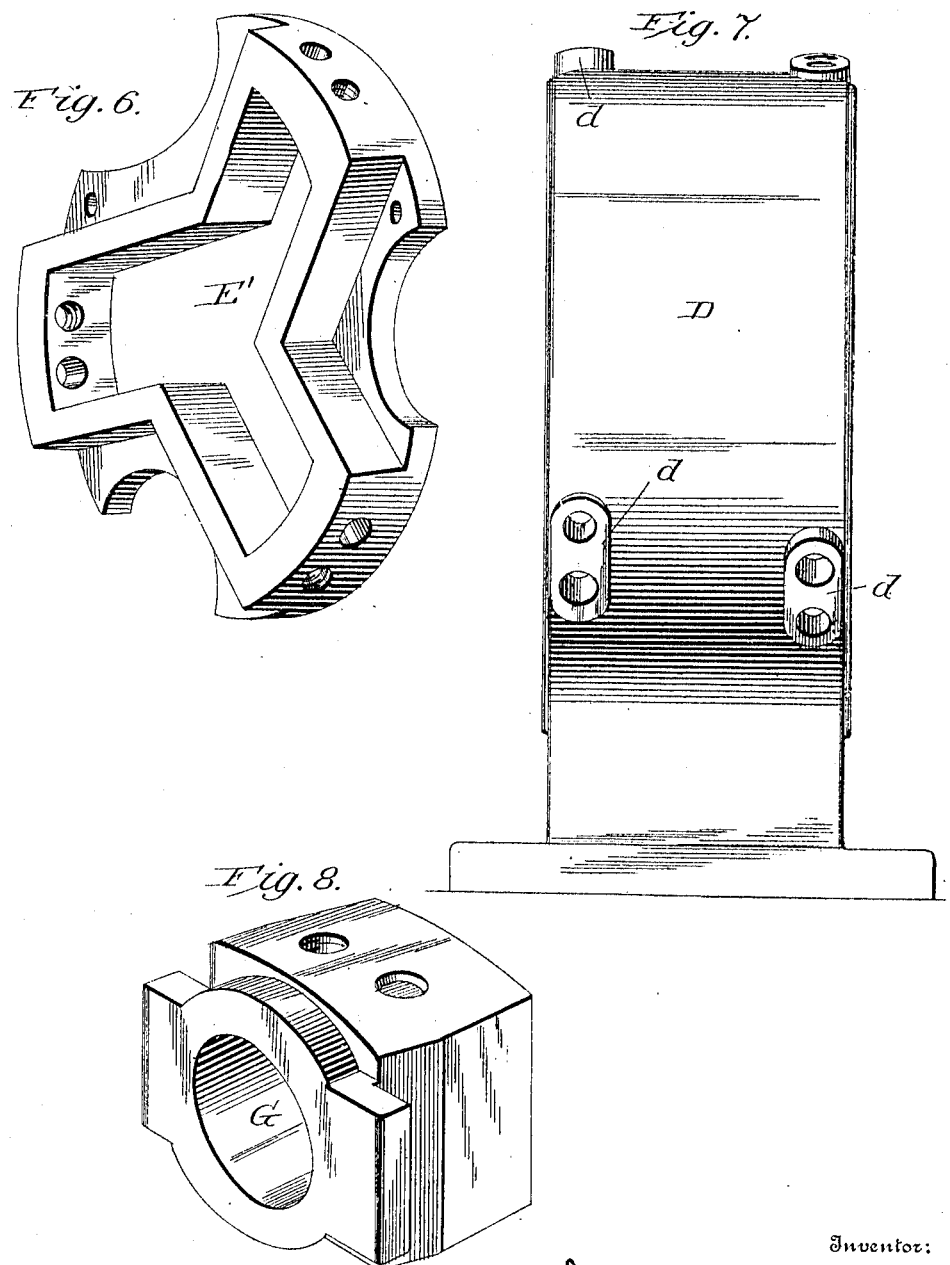

UNITED STATES PATENT OFFICE.

WALTER J. MUNCASTER, OF CUMBERLAND, MARYLAND.

STEADY-REST FOR SHAFTING-LATHES.

984,288.

Specification of Letters Patent.

Patented Feb. 14, 1911.

Application filed June 13, 1907. Serial No. 378,839.

*To all whom it may concern:*

Be it known that I, WALTER J. MUNCASTER, a citizen of the United States, residing at Cumberland, in the county of Allegany and State of Maryland, have invented certain new and useful Improvements in Steady-Rests for Shafting-Lathes, of which the following is a specification.

My invention consists in a steady rest of novel construction, designed primarily for use in or in connection with a machine for turning, dressing and finishing shafting, set forth in Letters Patent No. 851,547, granted to me on the 23rd day of April, 1907.

The purpose of my invention is to enable adjustment of the rollers of the rest to be easily and quickly made to adapt the rest to shafting or other bodies of different diameters. Better to explain its uses and advantages, I have shown it in position in a machine of the character above referred to, the receiving end only of such machine being shown.

Figure 1 is a front elevation of the receiving or infeeding end of a machine for producing finished shafting, showing the steady rest; Fig. 2, an elevation of the rest partly in section and with one roll shaft and its rolls removed; Fig. 3, a section on the line 3—3 of Fig. 2; Fig. 4, an elevation of the housing and guide plates, partly in section, the rolls, their shafts and bearings removed; Fig. 5, a section on the line 5—5 of Fig. 3; Fig. 6, a view of one of the guide plates removed from the housing; Fig. 7, an outside view of the shell or housing; and Fig. 8, a perspective view of one of the boxes or bearings of the roller shafts.

Referring to the drawings, A indicates a bed or base supported upon pedestals B, and carrying a group of three obliquely arranged rolls C which are driven by suitable gearing, and are provided with means for moving them radially toward and from a common axis about which they are grouped, said axis being the axis of the shafting or other cylindrical object to be operated upon.

D indicates the shell or housing of the steady rest to which my invention pertains, and E indicates a head carrying cutting tools and their adjusting devices, these parts being shown in Fig. 1 in their proper relations in order to make clear the common relation of the steady rest to the infeeding rolls and cutting tools. It may, however, be used in connection with other forms of machines than that here illustrated, and hence will be claimed independently thereof.

The rest comprises the outer shell or housing D, which is of hollow circular form and provided with suitable feet or supporting base; two heads or plates E' and F, formed with guideways, set within the ends of the drum and bolted or otherwise made fast to internal annular flanges a, b in the housing; boxes or bearing blocks G mounted and adjustable in the guideways; screws H and I for adjusting the boxes or bearing blocks; shafts J carried in said boxes or bearing blocks, and rollers K and L mounted upon opposite ends of the several shafts. The guideways in each plate or head are arranged on lines tangential to a small circle concentric with the axis of the housing D, but those of one plate are inclined in a direction the reverse of those in the other plate. From this reversed arrangement it follows that the axes of the roll shafts, each carried by two boxes or bearings, one in either head or plate, will have their obliquity with reference to the axis of the shell or housing D varied as the boxes are moved toward or from the axis of the shell or housing. This combination is designed to automatically adapt the rolls to the feeding and rotation of shafting of varying diameters. This same arrangement of guideways obtains in connection with the infeeding rolls C, which produce both a rotary and a longitudinal movement of the shafting to be treated. Accurate correspondence of angularity in the infeeding rolls and the steady rest rolls is necessary to avoid any marring of the shafting by the latter, and to prevent rubbing friction which would tend to retard the advance of the work.

The arrangement of the guideways is illustrated in Figs. 2 and 4, where will also be seen the construction of the boxes or bearing blocks G. These consist of blocks or castings preferably provided with bushings c which may be of Babbitt metal, brass, or other suitable composition or alloy, both the boxes and the bushings being provided at their outer ends with flanges to prevent their movement inward with reference to the guide plates or heads E' and F. The shafts J fit accurately within the bushings, or the boxes themselves if unbushed, and the rollers K and L are brought by their fastening bolts close against the outer ends of the bushings, or of the boxes, so that longitudinal movement of the rolls, the shafts, or the boxes is prevented.

The shell or housing D is formed with bosses $d$ having holes or openings $e$ for the free passage through them of the screws H and I. As best seen in Fig. 2, the screws H are simply screw-threaded stems one end of which passing through openings $e$ in the shell or housing D and in the guide plates, is firmly screwed into the bearing blocks G as shown in Fig. 3, their outer ends protruding beyond the shell or housing D, and being there furnished with nuts $f$ which bear upon the outer faces of the bosses $d$. By turning the nuts $f$ the boxes or bearing blocks G may be drawn upward to whatever extent permitted by the stop screws or bolts I. Said stop screws or bolts I are screwed into and through threaded openings in the guide plates as shown in Figs. 2, 3 and 4, and bear at their inner ends against the outer faces of the boxes or bearing blocks G. They thus form stops to determine the outward limit of movement of the boxes or bearing blocks. Each screw I is provided with a jam-nut $g$ to prevent its being accidentally turned through jarring or vibration of the machinery.

By backing the nuts $f$ of the screws H, the boxes or bearing blocks G are made free to move inward toward the common axis about which they are grouped, and by loosening the jam-nuts $g$ and turning the screws I the blocks may be forced inward toward said common axis. This arrangement gives great accuracy or nicety of adjustment, and serves to hold the blocks rigidly in their adjusted position.

The rollers K and L are preferably of the form shown in Figs. 1, 3 and 5; that is to say, they are beveled on the forward or receiving side to facilitate the entrance of the work between them. Their office is to give a rolling support to the shafting or other body under treatment, maintaining it in proper relation to the cutting and dressing tools of the machine and supporting it against springing or lateral movement, but doing so without producing rubbing friction. As the shaft moves forward, and with a screw-like motion incident to the rotation of the obliquely arranged rollers C, it imparts a like rotation to the rollers K and L, the obliquity of whose axes being the same as that of the rollers C, they will simply roll with the shafting, and produce no rubbing or grinding effect.

In moving toward and from the common axis about which the rolls are grouped, and owing to the reversed inclination or obliquity of the guideways for the boxes or bearing blocks G at opposite ends of the roller shafts, there would be a tendency of the blocks to cramp or bind in the guideways were not provision made to guard against such effect. This is accomplished by very slightly beveling the side faces of the blocks or bearings G each way from a medial point in their length (as shown in Figs. 5 and 8), so that the block may rock or tip very slightly upon the ridge or line of meeting of the two surfaces of each side face. This is indicated in Fig. 5, but owing to the relatively small scale of the drawing, it is not very noticeable. It will be seen, however, that with the roll at its extreme adjustment in one direction, there indicated, each block G has a bearing through about one-half its side surface on each side. The same effect may be attained by rounding instead of beveling the surfaces, or in other words, making a single curved face on each side of the block G instead of two faces slightly out of plane, or at an angle one to the other, the curve being in such event struck from a center coincident with the axis of the roll shaft or its bearing block. Very slight longitudinal play of the boxes is provided to permit the angling of the shafts without binding of the boxes, though, of course, the common expedient of curving the side faces of the guideways and outer faces of the plates in which they are formed would render unnecessary the expedients here disclosed.

It is important in a steady rest that the rollers which support and guide the work be brought as close as possible to the feed rolls, the cutters, and other parts which in any manner act upon the work or body under treatment, in order that there may be no springing or vibration of the work. It is therefore necessary to place said rollers outside of or beyond the boxes which support their shafts, instead of between said boxes.

Having thus described my invention, what I claim is:

1. A steady rest comprising a shell or housing having at opposite ends slightly non-radial guideways, the guideways at one end being inclined in a reverse direction from those at the opposite end; boxes or bearing blocks carried in said guideways; shafts carried in said boxes and provided with rollers outside of or beyond the boxes; and means for moving said boxes toward and from the common axis about which they are grouped, and thereby varying the angularity of the roller shafts and rollers relatively to the common axis about which they are grouped, as the boxes are moved toward and from said common axis.

2. The herein-described steady rest comprising a shell or housing D having internal annular flanges $a$, $b$; heads E, F made fast to said flanges and provided with slightly non-radial guideways, the inclination of the guideways of head E being the reverse of that of the guideways of head F; boxes or bearing blocks G mounted in said guideways; screws H and I for adjusting the boxes or bearing blocks G; shafts J carried in said bearing blocks or boxes, and rollers K, L carried by the shafts, all substantially as described and shown.

3. In a steady rest, the combination of a shell or housing; shafts mounted in said shell or housing, and movable toward and from the axis thereof; rollers carried by said shafts outside of or beyond the boxes; and means, substantially such as described, for varying the obliquity of the axes of the rolls with reference to the common axis about which they are grouped as the rolls are moved toward and from said common axis.

4. In a steady rest, the combination of a shell or housing; shafts mounted in said housing and movable toward and from the axis of the housing; rolls carried by said shafts outside of or beyond the housing, the shafts being capable of adjustment to vary the obliquity of their axes relatively to the common axis about which they are grouped.

5. In a steady rest, the combination of a shell or housing; a series of shafts mounted therein with their axes oblique to the common axis about which they are grouped; rolls carried by said shafts outside of or beyond the boxes; and means for automatically varying the obliquity of the roll shafts in the act of moving the rolls toward or from the common axis.

In testimony whereof I have signed my name to this specification in the presence of two subscribing witnesses.

WALTER J. MUNCASTER.

Witnesses:
J. F. STARK,
ALBERT CHARLES.